(12) United States Patent
Su (10) Patent No.: US 10,936,234 B2
(45) Date of Patent: Mar. 2, 2021

(54) DATA TRANSFER BETWEEN MEMORY DEVICES ON SHARED BUS

(71) Applicant: Macronix International Co., Ltd., Hsinchu (TW)

(72) Inventor: Chun-Lien Su, Taichung (TW)

(73) Assignee: Macronix International Co., Ltd., Hsinchu (TW)

( * ) Notice: Subject to any disclaimer, the term of this patent is extended or adjusted under 35 U.S.C. 154(b) by 28 days.

(21) Appl. No.: 16/419,298

(22) Filed: May 22, 2019

(65) Prior Publication Data

US 2020/0371703 A1 Nov. 26, 2020

(51) Int. Cl.
*G06F 3/06* (2006.01)
*G06F 13/16* (2006.01)

(52) U.S. Cl.
CPC .......... *G06F 3/0647* (2013.01); *G06F 3/0604* (2013.01); *G06F 3/0659* (2013.01); *G06F 3/0673* (2013.01); *G06F 13/1668* (2013.01); *G06F 2213/16* (2013.01)

(58) Field of Classification Search
CPC .... G06F 3/0647; G06F 3/0604; G06F 3/0659; G06F 3/0673; G06F 13/1668
See application file for complete search history.

(56) References Cited

U.S. PATENT DOCUMENTS

| 6,356,962 B1* | 3/2002 | Kasper | G06F 13/128 |
| | | | 370/229 |
| 7,447,853 B2* | 11/2008 | Seong | G06F 11/1456 |
| | | | 711/162 |
| 8,135,881 B1* | 3/2012 | Obkircher | G06F 13/4291 |
| | | | 710/37 |
| 8,364,873 B2* | 1/2013 | Chen | G06F 13/387 |
| | | | 710/110 |
| 8,429,329 B2* | 4/2013 | Pekny | G06F 12/0804 |
| | | | 711/103 |
| 9,830,280 B2* | 11/2017 | Riess | G06F 13/385 |
| 10,397,021 B2* | 8/2019 | Kessler | G06F 13/40 |
| 2008/0147940 A1* | 6/2008 | Kao | G06F 13/24 |
| | | | 710/107 |

(Continued)

OTHER PUBLICATIONS

Yoo, Seung-mok, MHP: Master-Handoff Protocol for Fast and Energy-Efficient Data Transfer over SPI in Wireless Sensing Systems. ETRI Journal, Aug. 2012 (Year: 2012).*

*Primary Examiner* — Ryan Bertram
(74) *Attorney, Agent, or Firm* — Fish & Richardson P.C.

(57) ABSTRACT

Systems, devices, and methods for data transfer between memory devices on a shared bus are provided. In one aspect, a system includes first and second memory devices and a shared bus. A host device is configured to send at least one control signal through the shared bus to the first and second memory devices, and the control signal specifies data to be transferred from the first memory device to the second memory device. In response to receiving the control signal, the first memory device is configured to read and transmit the data to the shared bus, and the second memory device is configured to receive the data from the shared bus and write the data in the second memory device. The data is transferred directly from the first memory device to the second memory device through the shared bus without passing through the host device.

23 Claims, 6 Drawing Sheets

(56) References Cited

U.S. PATENT DOCUMENTS

| | | | |
|---|---|---|---|
| 2009/0259785 A1* | 10/2009 | Perry | G06F 13/28 |
| | | | 710/110 |
| 2009/0265494 A1* | 10/2009 | Toki | G06F 13/4045 |
| | | | 710/110 |
| 2010/0061152 A1* | 3/2010 | De Caro | G11C 7/22 |
| | | | 365/185.18 |
| 2010/0199007 A1* | 8/2010 | Kapelner | G06F 13/423 |
| | | | 710/110 |
| 2012/0005411 A1* | 1/2012 | Rolandi | G11C 16/20 |
| | | | 711/103 |
| 2015/0293880 A1* | 10/2015 | Yoon | G06F 13/1673 |
| | | | 710/308 |
| 2016/0110272 A1* | 4/2016 | Tracht | G06F 11/14 |
| | | | 711/162 |
| 2016/0267034 A1* | 9/2016 | Oda | G06F 13/4282 |
| 2016/0350240 A1* | 12/2016 | Grafton | G06F 13/1668 |
| 2017/0256297 A1* | 9/2017 | Intrater | G11C 7/106 |
| 2018/0052802 A1* | 2/2018 | Pitigoi-Aron | G06F 13/4291 |
| 2018/0157611 A1* | 6/2018 | Sengoku | G06F 13/4004 |
| 2018/0267721 A1* | 9/2018 | Reddy | G06F 3/0619 |
| 2019/0236276 A1* | 8/2019 | Hershman | G06F 21/57 |

* cited by examiner

DATA TRANSFER BETWEEN MEMORY DEVICES ON SHARED BUS

BACKGROUND

Serial Peripheral Interface (SPI) is a synchronous serial communication interface specification. SPI devices can communicate through a shared bus in a full duplex mode using a master-slave architecture with a single master and one or more slaves. In some cases, for data transfer between different slaves, the master needs to first read out data from a source slave through the shared bus into a data buffer and then write the data from the data buffer through the shared bus to a designation slave. However, this data transfer can cause bus traffic on the shared bus.

SUMMARY

The present disclosure describes systems, devices and techniques for transferring data between memory devices on a shared bus, for example, by using control signals for the memory devices such that the data can be directly transmitted from a source memory device to a designation memory device through the shared bus, which can greatly reduce data traffic and improve system speed and flexibility.

One aspect of the present disclosure features a system for data transfer between memory devices. The system includes a plurality of memory devices including first and second memory devices and a shared bus coupled to the plurality of memory devices. The first memory device is configured to: receive at least one control signal on the shared bus from a host device coupled to the shared bus and in response to receiving the control signal, transmit data specified by the control signal from the first memory device to the shared bus. The second memory device is configured to: receive the control signal on the shared bus from the host device and in response to receiving the control signal, receive the data from the first memory device on the shared bus, the control signal specifying transferring the data from the first memory device to the second memory device.

In some implementations, the first memory device is configured to transmit the data after obtaining a clock signal, and the second memory device is configured to receive the data after obtaining the clock signal, the clock signal being for synchronization between the first memory device and the second memory device. One of the first memory device and the second memory device is configured to provide the clock signal to the shared bus. The clock signal can be provided when the first and second memory devices are powered on. The clock signal can be provided by one of the first and second memory devices. The clock signal can be provided by the host device to the shared bus, and wherein the host device is coupled to the shared bus and configured to communicate to the plurality of memory devices through the shared bus.

In some implementations, the host device is configured to select each of the plurality of memory devices by asserting a respective chip enable signal, and the host device is configured to simultaneously select the first and second memory devices by asserting one of a common chip enable signal and respective first and second chip enable signals when the data is transferred from the first memory device to the second memory device.

The control signal can include information of source and destination memory devices, source address information for the data to be read out, and destination address information for the data to be written in, and the information of source and destination memory devices can specify the first memory device to be the source memory device and the second memory device to be the destination memory device. The information of source and destination memory devices can include a digital value specifying the first memory device to be the source memory device and the second memory device to be the destination memory device.

The control signal can include length information of the data to be transferred. The control signal can include one or more dummy cycles for one of the first and second memory devices that has a slower response time than the other one of the first and second memory devices. The host device can be configured to determine the dummy cycles based on a property of the one of the first and second memory devices.

In some cases, the first and second memory devices are configured to receive a second command on the shared bus, and where the second command includes a digital value specifying the first memory device to be a second destination memory device and the second memory device to be a second source memory device. In some cases, the information of source and destination memory devices includes a first digital value specifying the first memory device to be the source memory device and a second digital value specifying the second memory device to be the destination memory device. In some cases, the first and second memory devices are configured to receive a second command on the shared bus, and the second command comprises a first digital value specifying the first memory device to be a second destination memory device and a second digital value specifying the second memory device to be a second source memory device.

In some implementations, the host device is configured to send the control signal in a single command packet to the shared bus. The host device can be configured to send a specific command to the first and second memory devices through the shared bus, the specific command configuring the first and second memory devices to be in a stateless protocol where the first and second memory devices have no information about a previous data stream and start fresh with each data input.

In some implementations, the host device is configured to send the control signal in a series of separate command packets to the shared bus. The series of separate command packets can include a first command to the first memory device for a read operation and address information of the data to be read. The host device can be configured to select the first memory device by asserting a first chip enable signal and unselect the second memory device when the first command is sent to the shared bus.

In some cases, the series of separate command packets include a second command to the second memory device for a write operation and address information of the data to be written. The host device can be configured to select the second memory device by asserting a second chip enable signal and unselect the first memory device when the second command is sent to the shared bus.

In some cases, the series of separate command packets include a data transfer command for initializing transferring the data from the first command device to the second command device.

In some cases, the host device is configured to send a specific command to the first and second memory devices through the shared bus, the specific command configuring the first and second memory devices to be in a stateful protocol where information about previous data characters or packets is stored in variables and used to affect processing of a current character or packet.

In some cases, the host device is configured to: dis-assert first and second chip enable signals for unselecting the first and second memory devices to interrupt the data transferring, and re-assert the first and second chip enable signals for selecting the first and second memory devices to resume the data transferring.

The shared bus can have an interface supporting multiple I/Os. In some implementations, the first memory device includes a flash memory, and the second memory device includes a random access memory (RAM). In some cases, the plurality of memory devices can be in a multi-chip package. In some cases, one of the first and second memory devices can be in a multi-chip package, and the other one of the first and second memory devices can be outside of the multi-chip package and coupled to the multi-chip package through the shared bus.

The data specified by the control signal can be transferred directly from the first memory device to the second memory device through the shared bus without passing through the host device.

In some implementations, the host device is external to the system including the plurality of memory devices and the shared bus. In some implementations, the system includes the host device, the plurality of memory devices and the shared bus.

In some cases, the host device is configured to provide a clock signal to the first and second memory devices through the shared bus, the clock signal being for synchronization between the first and second memory devices before the data is transferred.

In some cases, the host device is configured to receive the data from the shared bus when the data is transferred from the first memory device to the second memory device on the shared bus. The host device can be configured to store the received data in a buffer of the host device. The host device can be configured to buffer the data in a designated location of the second memory device.

In some cases, the host device is configured to select each of the plurality of memory devices by asserting a respective chip enable signal, and the host device is configured to simultaneously select the first and second memory devices by asserting one of a common chip enable signal and respective first and second chip enable signals when the data is transferred from the first memory device to the second memory device.

Another aspect of the present disclosure features a memory device including a memory for storing data and a memory controller coupled to the memory. The memory controller is configured to: receive at least one control signal from a host device through a shared bus, the control signal including information associated with particular data in the memory to be transferred to a second memory device; read the particular data specified by the control signal from the memory; and transmit the particular data to the shared bus such that the second memory device is capable of receiving the particular data from the shared bus and writing the particular data in a destination location of the second memory device according to the control signal.

A further aspect of the present disclosure features a memory device including a memory for storing data and a memory controller coupled to the memory. The memory controller is configured to: receive at least one control signal from a host device through a shared bus, the control signal including information associated with particular data to be transferred from a source memory device and to be stored in the memory; receive the particular data from the source memory device through the shared bus; and write the particular data in a destination location of the memory according to the control signal.

Implementations of the above techniques include methods, systems, computer program products and computer-readable media. In one example, one computer program product is suitably embodied in a non-transitory machine-readable medium that stores instructions executable by one or more processors. In another example, a system includes one or more processors and one such computer program product that stores instructions executable by the one or more processors. The instructions are configured to cause the one or more processors to perform the above-described actions.

The techniques use control signals for source and designation (or target) memory devices (e.g., memory chips), and enable moving data directly from the source memory chip, e.g., a flash memory, to one or more designation memory chips, e.g., random access memories (RAMs), through a shared bus. The control signals can be pre-defined commands. The control signals can be pre-stored or configured in the source and designation memory chips or sent from a host device. The source memory chip can be configured to perform a read operation and the destination memory chip can be configured to perform a write operation, such that the source memory chip can output (or send) data to the shared bus and the designation memory chip can receive the data from the shared bus, without through the host device or any direct memory access (DMA) engines. The host device can also buffer the data by receiving the data from the shared bus at the same time. The host device can leverage this operation to fetch the data from the source memory chip and store the data at its cache buffer. The host device can also manage its cache buffer and the designation memory chip to improve overall I/O (input/output) performance of the source memory chip. Particularly, the techniques can be applied to the source memory chips that do not support random access. The host device can also buffer the data at a designated location of the designation memory chip (e.g., RAM) when the host device is reading out the data from the source memory chip (e.g., flash memory). The source memory chip and the designation memory chip can be within a multi-chip-package (MCP). In some cases, the techniques can be applied to separated memory chips with a shared bus even they are not in the same package as MCP.

The techniques can reduce power, reduce data transfer (or moving) operations, and improve response time. For example, when a system is powered on, code or data can automatically be transferred from a source memory chip (e.g., a flash) to a designation memory chip (e.g., a RAM) according to a default configuration in the source and designation memory chips according to a clock signal from the host device or a data strobe (DQS) signal from the source memory device. Furthermore, the clock signal for synchronization not only can be provided by the host device but also by the source memory chip or even the designation memory chip according to chip configurations. The default configuration can be implemented by the host device configuring a shadowing area to set specific registers of the source and designation memory chips if necessary, and the default configuration will take effective in a next boot-up. The host device can also interrupt the auto shadowing and reconfigure to re-start data transfer from the source memory chip to the designation memory chip by using a control signal.

In some cases, a program command can be broken down into three phases: a command section with address information, a data transfer section, and an execution section. In some cases, when the number of bytes of collected data has reached the length (in bytes) of the program command, the program command can be broken down into two phases: the command section with address information, and the data transfer section. In some cases, the program command is implemented in only one command packet. The memory chips can be configured to be in a stateless protocol, where the memory chips have no information about a previous data stream and start fresh with each data input. In some cases, the program command is implemented through a series of command packets. The memory chips can be configured to be in a stateful protocol, where information about previous data characters or packets is stored in variables and used to affect processing of a current character or packet. The command packets can include source setup, destination setup, data transfer and flash programming if the source memory chip is a flash memory. Data transfer can be interrupted by de-asserting chip select to release the shared bus, e.g., for emergency operation. A resume operation can be issued to continue the data transfer. This allows transferring a large amount of data.

The techniques can be applied to various memory types, such as SLC (single-level cell) devices, or MLC (multi-level cell) devices like 2-level cell devices or TLC (triple-level cell) devices. The techniques can be applied to various types of volatile memory systems, such as RAM, static RAM (SRAM), dynamic RAM (DRAM), among others. The techniques can be applied to various types of non-volatile memory systems, such as NAND flash memory, mask read-only memory (MROM), erasable programmable read-only memory (EPROM), Ferroelectric RAM (FeRAM), Magnetoresistive RAM (MRAM), among others. Additionally or alternatively, the techniques can be applied to various types of devices and systems, such as secure digital (SD) cards, embedded multimedia cards (eMMC), or solid-state drives (SSDs), embedded systems, silicon-on-chip (SOC) systems, among others.

The details of one or more disclosed implementations are set forth in the accompanying drawings and the description below. Other features, aspects, and advantages will become apparent from the description, the drawings and the claims.

DETAILED DESCRIPTION

Implementations of the present disclosure provide systems, devices and methods for data transfer between memory devices on a shared bus, which can reduce bus traffic when moving data back and forth between the memory devices, e.g., different memory chips inside a multi-chip package (MCP). The memory devices can be any suitable memory devices that are coupled to the shared bus and have different response times. In some implementations, a master (or a host device) can send a control signal, e.g., pre-defined command, to both a source slave and a designation slave, and data can be moved directly from the source slave to the designation slave, without through the master or a DMA engine. The memory devices can include volatile memory systems such as Random Access Memories (RAMs), non-volatile memory systems such as flash memories (e.g., NAND flash memory), MROM, EPROM, FeRAM, MRAM, and any other types of memories that have different response time than RAMs.

Figure 1A:
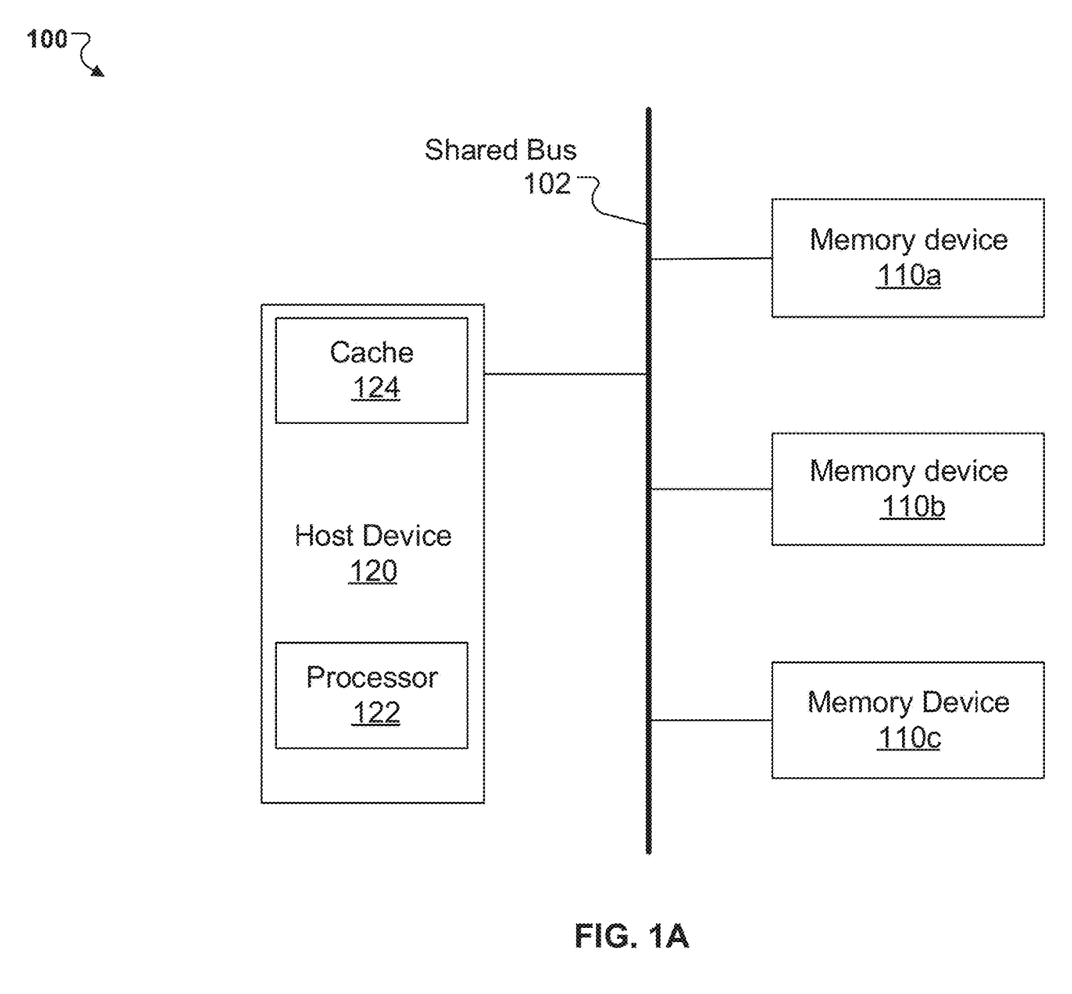
FIG. 1A illustrates an example of a system for data transfer between memory devices on a shared bus, according to one or more implementations.

FIG. 1A illustrates an example of a system 100 for data transfer between memory systems on a shared bus, according to one or more implementations. The system 100 includes a host device 120, a shared bus 102, and a number of memory devices 110a, 110b, 110c. Each of the memory devices 110a, 110b, 110c can be a memory chip. In some implementations, the memory devices 110a and 110b are included in a multi-chip package (MCP). The memory device 110c is outside of the MCP. In some implementations, the memory devices 110a, 110b, 110c are all included in an MCP. The system 100 can be a silicon-on-chip (SOC) system.

In some examples, the memory device 110a is a non-volatile memory that is configured for long-term storage of instructions and/or data, e.g., a flash memory device. In some examples, the memory device 110b is a volatile memory that is configured to use electric power to read and/or write data, e.g., a RAM memory device. The RAM memory device can have a faster reading and writing speed than the flash memory device. In some examples, the memory devices 110a and 110b are the same type of memory, e.g., non-volatile memory or volatile memory, but have different response times. The memory device 110a can have a slower response time than the memory device 110b, or the memory device 110b can have a slower response time than the memory device 110a.

Figure 1B:
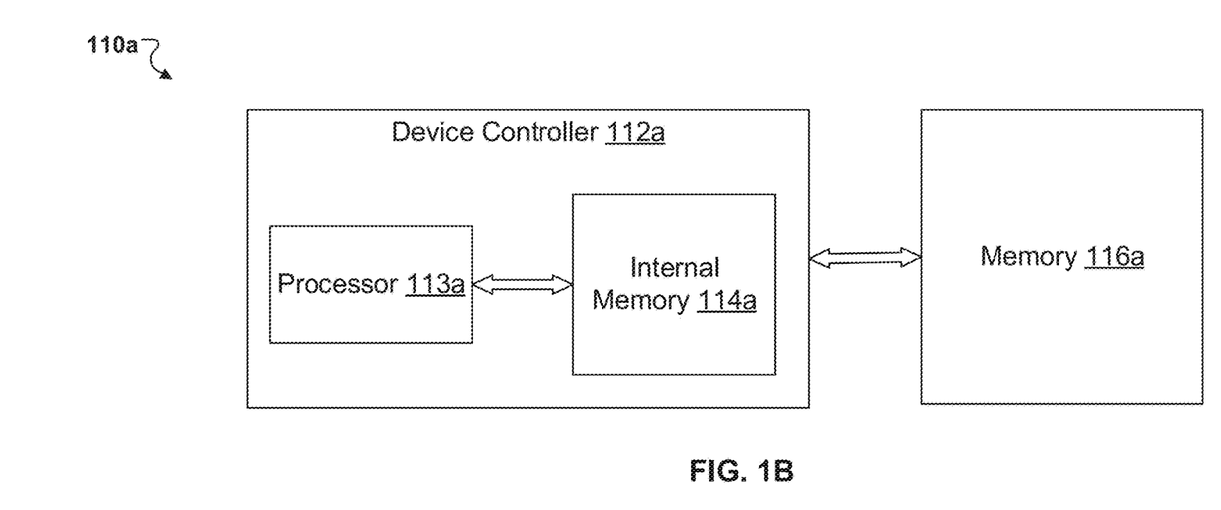
FIG. 1B illustrates an example of a memory device, according to one or more implementations.

FIG. 1B shows an example of the memory device 110a, according to one or more implementations. The memory device 110a includes a device controller 112a and a memory 116a. The device controller 112a includes a processor 113a and an internal memory 114a.

In some implementations, the memory device 110a is a storage device. For example, the memory device 110a can be an embedded multimedia card (eMMC), a secure digital (SD) card, a solid-state drive (SSD), or some other suitable storage. In some implementations, the memory device 110a is a smart watch, a digital camera or a media player. In some implementations, the memory device 110a is a client device that is coupled to the host device 120. For example, the memory device 110a is an SD card in a digital camera or a media player that is the host device 120.

The device controller 112a can be a general-purpose microprocessor, or an application-specific microcontroller. In some implementations, the device controller 112a is a memory controller for the memory device 110a. The following sections describe the various techniques based on implementations in which the device controller 112a is a memory controller. However, the techniques described in the following sections are also applicable in implementations in which the device controller 112a is another type of controller that is different from a memory controller.

The processor 113a is configured to execute instructions and process data. The instructions include firmware instructions and/or other program instructions that are stored as firmware code and/or other program code, respectively, in the internal memory 114a. The data includes program data corresponding to the firmware and/or other programs executed by the processor, among other suitable data. In some implementations, the processor 113a is a general-purpose microprocessor, or an application-specific microcontroller. The processor 113a can be also referred to as a central processing unit (CPU).

The processor 113a accesses instructions and data from the internal memory 114a. In some implementations, the internal memory 114a is a Static Random Access Memory (SRAM) or a Dynamic Random Access Memory (DRAM). For example, in some implementations, when the memory device 110a is an eMMC, an SD card or a smart watch, the internal memory 114a is an SRAM. In some implementations, when the memory device 110a is a digital camera or a media player, the internal memory 114a is DRAM.

In some implementations, the internal memory 114a is a cache memory that is included in the device controller 112a, as shown in FIG. 1B. The internal memory 114a stores instruction codes, which correspond to the instructions executed by the processor 113a, and/or the data that are requested by the processor 113a during runtime.

The device controller 112a transfers the instruction code and/or the data from the memory 116a to the internal memory 114a. In some implementations, the memory 116a is a non-volatile memory that is configured for long-term storage of instructions and/or data, e.g., a NAND flash memory device, or some other suitable non-volatile memory device. In implementations where the memory 116a is NAND flash memory, the memory device 110a is a flash memory device, e.g., a flash memory card, and the device controller 112a is a NAND flash controller. For example, in some implementations, when the memory device 110a is an eMMC or an SD card, the memory 116a is a NAND flash; in some implementations, when the memory device 110a is a digital camera, the memory 116a is an SD card; and in some implementations, when the memory device 110a is a media player, the memory 116a is a hard disk.

The memory device 110b can have the same configuration as the memory device 110a of FIG. 1B, except that the memory device 110b has a different response time from the memory device 110a.

Figure 1C:
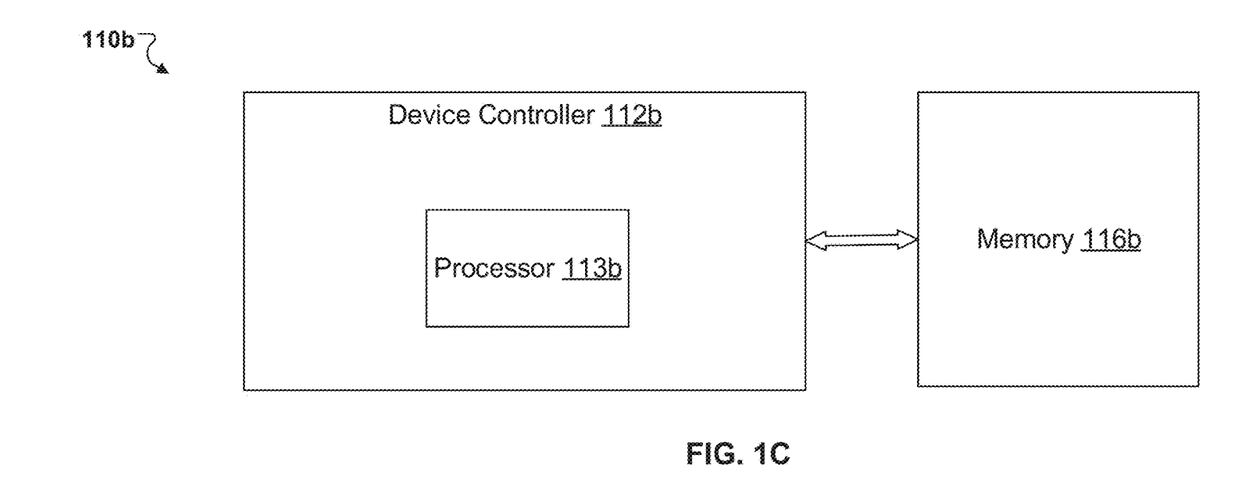
FIG. 1C illustrates another example of a memory device, according to one or more implementations.

FIG. 1C shows another example of the memory device 110b, according to one or more implementations. The memory device 110b includes a device controller 112b and a memory 116b. The device controller 112b includes a processor 113b. In some implementations, the device controller 112b can also include an internal memory similar to the internal memory 114a of FIG. 1B.

The device controller 112b can be similar to the device controller 112a of FIG. 1B. The device controller 112b can be a general-purpose microprocessor, or an application-specific microcontroller. In some implementations, the device controller 112b is a memory controller for the memory device 110b or any other type controller. The processor 113b can be similar to the processor 113a of FIG. 1B, and is configured to execute instructions and process data. The instructions include firmware instructions and/or other program instructions that are stored as firmware code and/or other program code, respectively. The data includes program data corresponding to the firmware and/or other programs executed by the processor, among other suitable data. In some implementations, the processor 113b is a general-purpose microprocessor, or an application-specific microcontroller. The processor 113b can be also referred to as a central processing unit (CPU).

The processor 113b accesses instructions and data from the memory 116b. In some implementations, the memory 116b is a Static Random Access Memory (SRAM) or a Dynamic Random Access Memory (DRAM). In some implementations, the memory 116b is a cache memory that is included in the device controller 112b. The memory 116b stores instruction codes, which correspond to the instructions executed by the processor 113b, and/or the data that are requested by the processor 113b during runtime.

The memory 116b can have a faster reading and writing speed than the memory 116a. In some implementations, the memory 116b is a volatile memory that is configured to use electric power to read and/or write data, e.g., a RAM memory. In some implementations, the memory 116b is a non-volatile memory that is configured for long-term storage of instructions and/or data, e.g., a flash memory.

The host device 120 includes at least one processor 122. The processor 122 can be configured to execute instructions and process data. The processor 122 can be a general-purpose microprocessor or an application-specific microcontroller. The processor 122 can be referred to as a central processing unit (CPU). The host device 120 includes a cache 124 configured to buffer data to and from the shared bus 102.

Each of the memory devices 110a, 110b, 110c is coupled to the shared bus 102 and configured to communicate with the host device 120 through the shared bus 102. The shared bus 102 can have a serial peripheral interface (SPI) or a variant that has a synchronous serial communication interface specification. The shared bus 102 can also have any other type of interface that supports multiple I/Os (inputs/outputs), such as Multi-I/O SPI, eMMC bus, open NAND flash interface (ONFI) or DRAM bus. The host device 120 and the memory devices 110a, 110b, 110c can communicate through the shared bus 102 in a full duplex mode using a master-slave architecture with the host device 120 as a single master and the memory devices 110a, 110b, 110c as slaves.

The host device 120 can connect to each of the memory devices 110a, 110b, 110c via a respective physical pin. The host device 120 can assert a chip enable (CE) signal to select a memory device via a respective physical pin, or dis-assert the CE signal to un-select the memory device via the respective physical pin. When the host device 120 asserts the CE signal to select the memory device, the memory device can receive a command, a clock signal, or data on the shared bus 102 or send data to the shared bus 102. In some implementations, a number of memory devices share a common CE signal. That is, the host device 120 can use the common CE signal to select or un-select the number of memory devices. For example, there are five memory devices coupled to the shared bus 102. A first memory device can be associated with a first CE signal, a second memory device can be associated with a second CE signal, and third, fourth and fifth memory devices can be associated with a third CE signal, which is a common CE signal for the three memory devices.

As discussed below with further details in FIG. 2A to FIG. 4, the host device 120 can send at least one control signal to the shared bus 102. The control signal can include one or more pre-defined commands. The control signal can include information of source and destination memory devices, source address information for data to be read out, and destination address information for data to be written in. The information of source and destination memory devices can specify a first memory device, e.g., the memory device 110a, to be the source memory device and a second memory device, e.g., the memory device 110b, to be the destination memory device. The host device 120 can issue each specific command for both source and destination memory devices respectively to set up their roles in advance through the shared bus 102. The source memory device can be configured to receive the control signal from the shared bus 102, to read the data specified by the control signal from a memory of the source memory device, e.g., from the memory 116a of the memory device 110a in FIG. 1B, and to transmit the data to the shared bus 102. The destination memory device can be configured to receive the control signal from the host device 120 through the shared bus 102 and configured by the control signal to receive the data from the shared bus 102, e.g., without through the host device 120 or without the host device intervening and to write the data in a destination location of a memory of the designation memory device, e.g., the memory 116b of the memory device 110b of FIG. 1C, according to the control signal. The control signal can specify two or more memory devices, e.g., both the memory devices 110b and 110c, as destination memory devices to receive the data from the source memory device.

In some implementations, the information of source and destination memory devices includes at least one digital value. The memory devices 110a, 110b are selected by the respective CE signals to receive the digital value from the shared bus 102. The digital value indicates that the memory device 110a is the source memory device; upon receiving the digital value the memory device 110a configures itself to perform a read operation, for example, according to a communication protocol between the memory device 110a and the host device 120. The digital value indicates that the memory device 110b is the destination memory device; upon receiving the digital value the memory device 110b configures itself to perform a write operation, for example, according to a communication protocol between the memory device 110b and the host device 120.

In some implementations, the information of source and destination memory devices includes multiple digital values. The memory device 110a can be selected by the respective CE signal to receive a first digital value from the shared bus 102. The first digital value indicates that the memory device 110a is the source memory device; upon receiving the first digital value the memory device 110a configures itself to perform a read operation. The memory device 110b can be selected by the respective CE signal to receive a second digital value from the shared bus 102. The second digital value indicates that the memory device 110b is the destination memory device; upon receiving the second digital value the memory device 110b configures itself to perform a write operation. In some examples, the memory devices 110a and 110b can be both selected to receive the first and second digital values from the shared bus 102. The first digital value indicates that the memory device 110a is the source memory device but is not used to indicate that the memory device 110b is the source memory device or the destination memory device. The second digital value indicates that the memory device 110b is the destination memory device but is not used to indicate that the memory device 110a is the source memory device or the destination memory device. In some examples, the memory devices 110a and 110b are respectively selected to receive the first digital value and the second digital value at different time points. In some examples, a plurality of digital values corresponds to a plurality of memory devices. Among the digital values, one digital value is used to indicate one of the memory devices as a source memory device, and the other digital values are used to indicate the other memory devices as destination memory devices or unrelated memory devices (not destination memory devices and not the source memory device). In such a way, the plurality of digital values can be used to set one source memory device and multiple destination memory devices (and optionally multiple unrelated memory devices that are not destination memory devices and not the source memory device).

The host device 120 can be configured to provide a clock signal to the source and destination memory devices through the shared bus 102. The source memory device can be configured to transmit data to the shared bus 102 after receiving the clock signal, and the destination memory device can be configured to receive the data from the shared bus 102 after receiving the clock signal. In some implementations, the clock signal can be used for synchronization between the source and destination memory devices. Each of the source and destination memory devices can be equipped with timing adjusting feature configured to help the devices to latch data and command correctly. For sake of conciseness, the clock signal is not shown in the drawings.

In some implementations, the control signal includes one or more dummy cycles, as illustrated in FIGS. 3A-3D. The dummy cycles are configured to provide a time delay for a memory device. The host device 120 can determine a number of the dummy cycles based on a property of the memory device. For example, if the source memory device is a flash memory and the destination memory device is a RAM, it may take more time for the flash memory to be ready for data transfer. The host device 120 can determine the performance (e.g., an operation speed) of the flash memory and then determine the number of dummy cycles based on the performance of the flash memory.

Figure 3A:
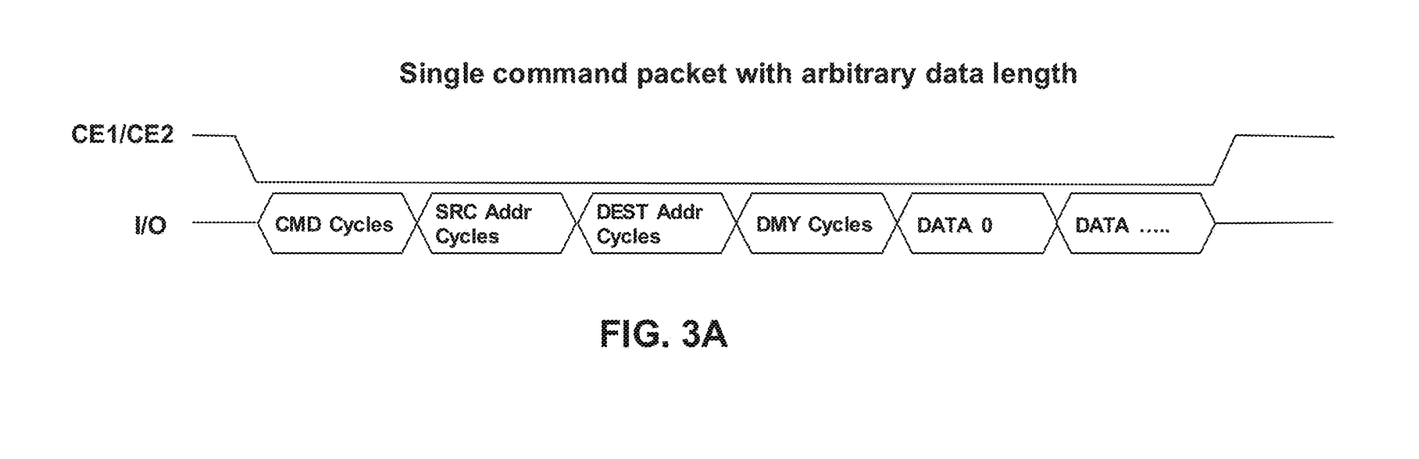
FIG. 3A illustrates a timing diagram for an example single command packet with arbitrary data length on a shared bus, according to one or more implementations.
Figure 3B:
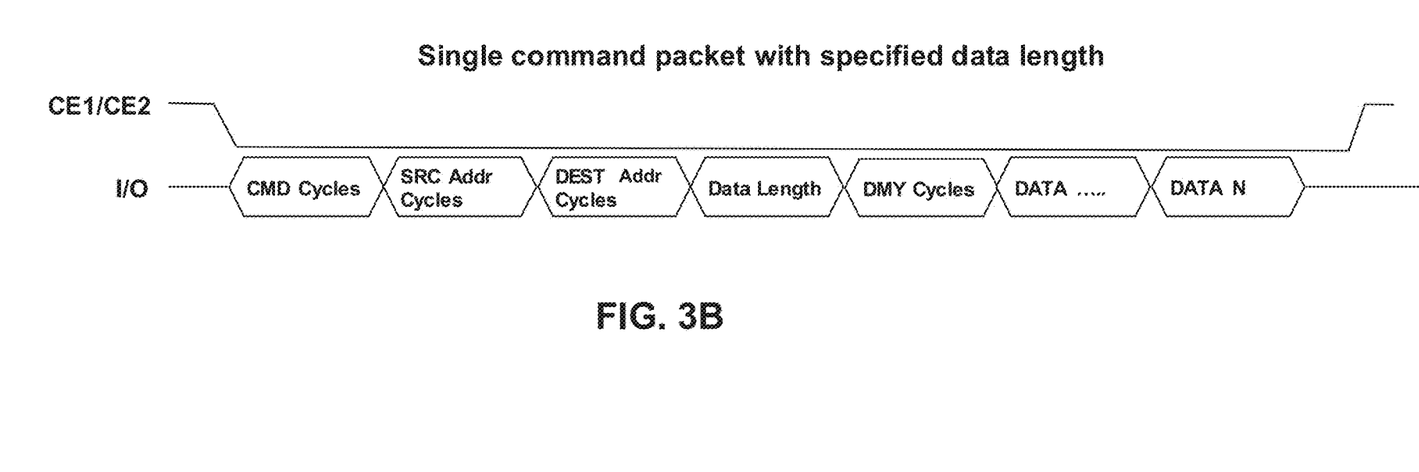
FIG. 3B illustrates a timing diagram for another example single command packet with specified data length on a shared bus, according to one or more implementations.
Figure 3C:
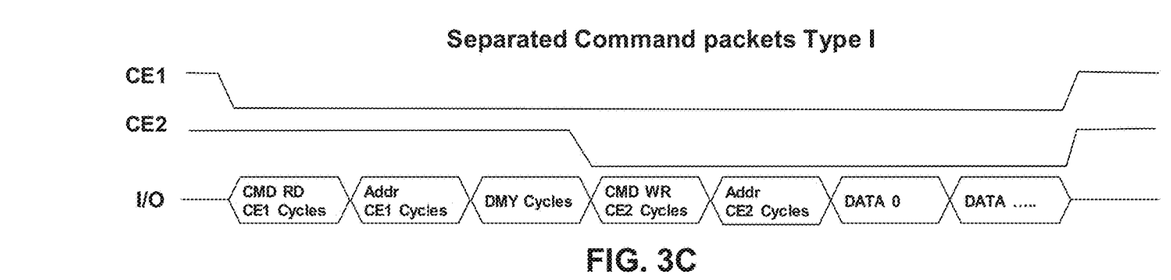
FIG. 3C illustrates a timing diagram for an example of separated command packets on a shared bus, according to one or more implementations.

In some implementations, as illustrated with further details in FIGS. 3A-3C, the host device 120 sends the control signal in one single command packet to the shared bus 102. Before sending the control signal, the host device 120 can send a specific command to the source and destination memory devices through the shared bus 102, and the source and destination memory devices can be configured by the specific command to be in a stateless protocol where the memory devices have no information about a previous data stream and start fresh with each data input.

Figure 3D:
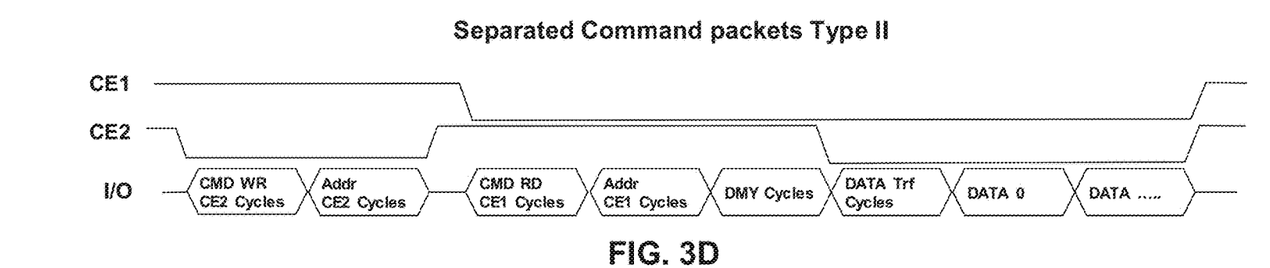
FIG. 3D illustrates a timing diagram for another example of separated command packets on a shared bus, according to one or more implementations.
Figure 3E:
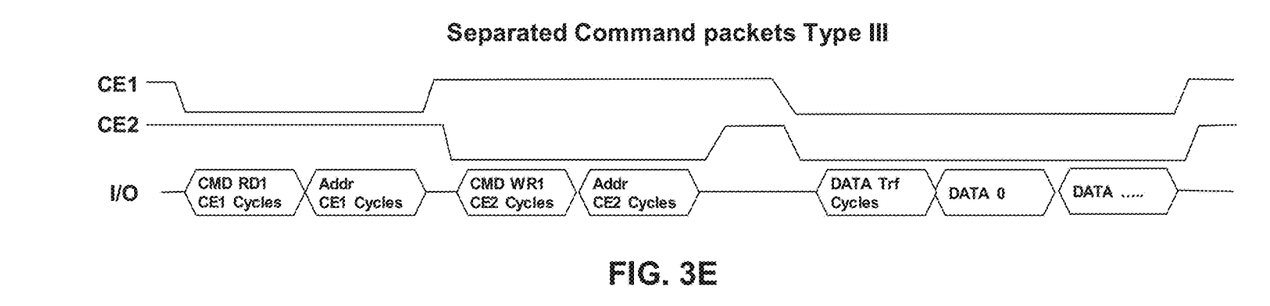
FIG. 3E illustrates a timing diagram for a further example of separated command packets on a shared bus, according to one or more implementations.

In some implementations, as illustrated with further details in FIGS. 3D-3E, the host device 120 sends the control signal in a series of separate command packets to the shared bus 102. Before sending the control signal, the host device 120 can send a specific command to the source and destination memory devices through the shared bus 102, and the source and destination memory devices can be configured by the specific command to be in a stateful protocol where information about previous data characters or packets is stored in variables and used to affect processing of a current character or packet. The host device 120 can interrupt data transfer from the source memory device to the destination memory device, e.g., in response to an emergency operation, by dis-asserting the chip enable signals to unselect the source and destination memory devices. The host device 120 can also resume the data transferring by asserting the chip enable signals to select the source and destination memory devices.

In some examples, applicable to any of the above implementations, the series of separate command packets include a first command to the source memory device for a read operation and address information of the data to be read. The host device can select the source memory device by asserting a first chip enable signal and unselect the destination memory device when the first command is sent to the shared bus 102. In some examples, the series of separate command packets include a second command to the destination memory device for a write operation and address information of the data to be written. The host device can select the destination memory device by asserting a second chip enable signal and unselect the source memory device when the second command is sent to the shared bus. In some examples, the series of separate command packets include a data transfer command for initializing transferring the data from the first command device to the second command device. The series of separate command packets can include the first command, the second command, and the data transfer command that are arranged in sequence. The first command can also include a number of dummy cycles.

Figure 2A:
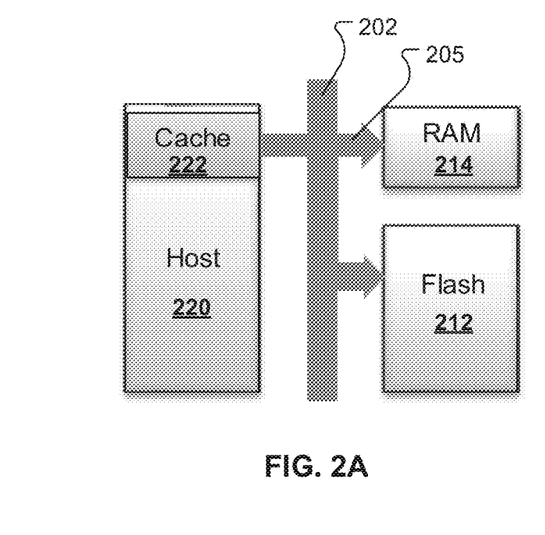
FIG. 2A illustrates an example command phase for data transfer among a host device, a flash memory device, and a RAM device, according to one or more implementations.
Figure 2B:
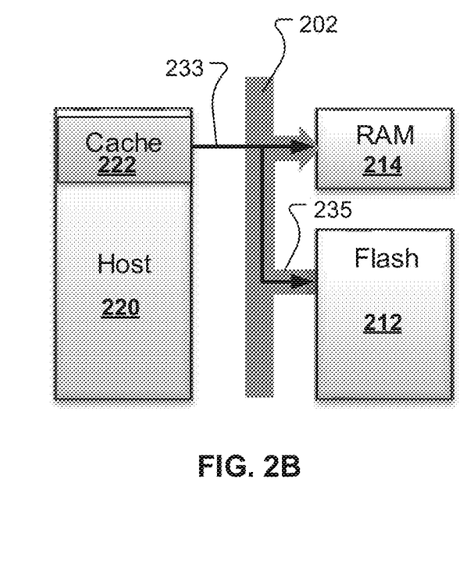
FIG. 2B illustrates an example data transfer phase in the data transfer from the flash memory device to the RAM device of FIG. 2A, according to one or more implementations.
Figure 2C:
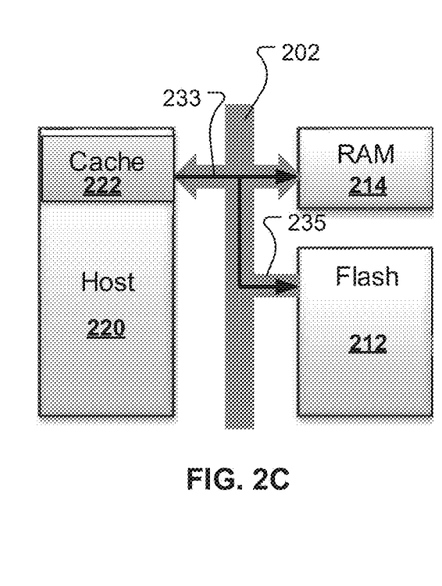
FIG. 2C illustrates another example data transfer phase in the data transfer from the flash memory device to the RAM device and the host device of FIG. 2A, according to one or more implementations.

As noted above, implementations of the present disclosure enable data transfer between any memory devices coupled to a shared bus that have different response times. For example, a source memory device, e.g., a flash memory, has a slower response time, while a destination memory device, e.g., a RAM or MRAM, has a faster response time. For illustration purposes only, FIGS. 2A-2C show data transfer between a host device 220, a flash memory device 212, and a RAM device 214 through a shared bus 202. The host device 220 and the shared bus 202 can be the host device 120 and the shared bus 102 of FIG. 1A, respectively. The flash memory device 212 and the RAM device 214 can be the memory devices 110a of FIGS. 1A and 1B, 110b of FIGS. 1A and 1C, respectively. The host device 220 includes a cache 222 that can be the cache 124 of FIG. 1A.

FIG. 2A illustrates an example command phase, where the host device 220 sends a control signal 205 to the shared bus 202. The host device 220 asserts respective chip enable signals to select the flash memory device 212 and/or the RAM device 214, such that each of the flash memory device 212 and the RAM device 214 can receive the control signal 205 simultaneously or individually. The host device 214 can be configured to simultaneously select the flash memory device 212 and the RAM device 214 by asserting a common chip enable signal or respective chip enable signals. The control signal 205 specifies the flash memory device 212 to be the source memory device and the RAM device 214 to be the destination memory device. As noted above, the control signal can also include source address information to specify particular data to be read from the flash memory device 212 and destination address information for the particular data to be written in the RAM device 214.

FIG. 2B illustrates an example data transfer phase. The host device 220 can send a clock signal 233 to the shared bus 202 such that the flash memory device 212 and the RAM device 214 can receive the clock signal 233 and synchronize with each other. In the data transfer phase, the flash memory device 212 can read the data 235 specified by the control signal 205 from a memory (e.g., a flash memory) of the flash memory device 212 and transmit the data 235 to the shared bus 202. The RAM device 214 can receive the data 235 from the shared bus 202 and write the data 235 in the destination address specified by the control signal 205. In this way, the data 235 can be directly transferred from the flash memory device 212 to the RAM device 214 through the shared bus 202, without passing through the host device 220.

FIG. 2C illustrates another example data transfer phase, where the host device 220 can also receive (or catch) the data 235 on the shared bus 202 when the flash memory device 212 transmits the data 235 to the RAM device 214 through the shared bus 202. The host device 220 can leverage the operation to fetch data from the flash memory device 212 and store the data in the cache 222. In some implementations, the host device 220 buffers the data 235 at a designated location of the RAM device 214 when the host device 220 is fetching the data 235 from the flash memory device 212 through the shared bus 202. In some implementations, the flash memory device 212 and the RAM device 214 are included in an MCP. The host device 202 can manage the cache 222 and the RAM device 214 inside the MCP together to improve overall I/O performance of the flash memory device 212 inside the MCP, especially for the flash memory device 212 that does not support random access.

In some implementations, the flash memory device 212 and the RAM device 214 are configured, e.g., by the control signal 205, to be in a default configuration. When the flash memory device 212 and the RAM device 214 are powered on, code or data can automatically be transferred from the flash memory device 212 to the RAM device 214 through the shared bus 202, according to the default configuration. The data transfer can be initialized by a clock signal. The clock signal is for synchronization of the flash memory device 212 and the RAM device 214. The clock signal can be from the host device 220. The clock signal can be also from the flash memory device 212 or the RAM device 214 and be provided to the shared bus 202 when the flash memory device 212 and the RAM device 214 are powered on.

A shadowing area for the default configuration can be configured, e.g., by the host device 220, by setting specific registers of the flash memory device 212 and the RAM device 214 such that the flash memory device 212 and the RAM device 214 can automatically perform the data transfer in a next boot-up. In some cases, if the RAM device 214 does not include fuse registers, the shadowing area inside the RAM device 214 can be configured by the flash memory device 212. For example, an amount of data, e.g., the first 4 bytes of data, transferred from the flash memory device 212 is used to configure the destination address of the RAM device 214. In such way, the flash memory device 212 provides fuse registers to configure not only the source address of the flash memory device 212 but also the destination address of the RAM device 214 for the capability on automatic shadowing operation. The host device 220 can also interrupt the auto shadowing and reconfigure the flash memory device 212 and the RAM device 214 to re-start the data transfer by the control signal as illustrated in FIGS. 2A-2B.

In some cases, the host device 220 can also send a control signal to configure the RAM device 214 as the source memory device and the flash memory device 212 as the designation memory device. The RAM device 214 can directly transfer data to the flash memory device 212 through the shared bus 202 according to the control signal.

FIGS. 3A-3E illustrate example command packets sent by a host device to a source memory device and a destination memory device through a shared bus. The host device can be the host device 120 of FIG. 1A or the host device 220 of FIGS. 2A-2C. The source memory device can be the memory device 110*a* of FIGS. 1A and 1B, or the flash memory device 212 of FIGS. 2A-2C. The destination memory device can be the memory device 110*b* of FIGS. 1A and 1C, or the RAM device 214 of FIGS. 2A-2C. The shared bus can be the shared bus 102 of FIG. 1A or the shared bus 202 of FIGS. 2A-2C.

As noted above, the host device can send a control signal to the source memory device and the destination memory device through the shared bus. The control signal can include a command section with address information, a data transfer section, and an optional execution section. The control signal can be implemented in only one command packet, as illustrated in FIGS. 3A-3B. The control signal can be also implemented through a series of command packets, as illustrated in FIGS. 3C-3E. The series of command packets can include a command packet for source setup, a command packet for destination setup, a command packet for data transfer, and an optional command packet for flash programming if the source memory device is a flash memory device.

For illustration only, CE1 is a first chip enable signal for the source memory device, CE2 is a second chip enable signal for the destination memory device. When the first (or second) chip enable signal is asserted, CE1 (or CE2) is low; when the first (or second) chip enable signal is dis-asserted, CE1 (or CE2) is high. I/O shows the signals on the shared bus.

FIG. 3A illustrates an example single command packet with arbitrary data length on the shared bus. The single command packet includes command cycles (CMD Cycles) source address cycles (SRC Addr Cycles), destination address cycles (DEST Addr Cycles), and dummy cycles (DMY Cycles), which are arranged in sequence. As noted above, the CMD Cycles include information of source and destination memory devices. The CMD Cycles can include one or more digital values to specify the source memory device and the destination memory device in form of one or more bytes. The SRC Addr Cycles include address information of data to be read from the source memory device. The DEST Addr Cycles include address information of the data to be written in the destination memory device. The address cycles can include multiple bytes, e.g., 3 bytes or 4 bytes, accordingly. The host device transmits the signals for the CMD, SRC and DEST cycles to the shared bus. The DMY cycles are determined by the host device to allow the source memory device or the destination memory device to be ready for the data transfer. No signals need be transmitted on the bus during the DMY cycles.

Then, during the DATA cycles, the source memory device reads and transmits the data in packets to the shared bus. CE1 and CE2 signals are asserted by the host device to select the source and destination memory devices during the command phase and the data transfer phase. As the single command packet does not specify a length of the data to be transferred, the data transfer continues until the CE1 and CE2 signals are dis-asserted by the host device to unselect the source memory device and the destination memory device.

FIG. 3B illustrates another example single command packet with specified data length on the shared bus. Compared to the single command packet in FIG. 3A, the single command packet in FIG. 3B includes a command for a specific data length of data to be transferred (Data Length). The command for the specific data length can be arranged between the DEST Addr Cycles and the DMY Cycles in the single command packet. Thus, the data can be completely transferred in N beats (or clock cycles). The CE1 and CE2 signals are dis-asserted after the data is completely transferred.

FIG. 3C illustrates an example of separated command packets on the shared bus. During sending a first command packet, the host device asserts CE1 signal to select the source memory device and dis-asserts CE2 signal to unselect the destination memory device. The first command packet includes information of command read cycles (CMD RD CE1 Cycles) that specifies the source memory device to perform a read operation, address information of the data to be read (Addr CE1 Cycles), and dummy cycles (DMY Cycles). The dummy cycles allow the source memory device to be ready for data transfer. During sending a second command packet, the host device asserts CE2 signal to select the destination memory device while keeping asserting CE1 signal to select the source memory device. The second command packet includes information of command write cycles (CMD WR CE2 Cycles) that specifies the destination memory device to perform a write operation and address information of the data to be written (Addr CE2 Cycles). Then the data is transferred until the CE1 and CE2 are dis-asserted or the data is completely transferred.

FIG. 3D illustrates another example of separated command packets on the shared bus. During sending a first command packet, the host device asserts CE2 signal to select the destination memory device and dis-asserts CE1 signal to unselect the source memory device. The first command packet includes information of command write cycles (CMD WR CE2 Cycles) that specifies the destination memory device to perform a write operation and address information of data to be written (Addr CE2 Cycles). During sending a second command packet, the host device asserts CE1 signal to select the source memory device and dis-asserts CE2 signal to unselect the destination memory device. The second command packet includes information of command read cycles (CMD RD CE1 Cycles) that specifies the source memory device to perform a read operation, address information of the data to be read (Addr CE1 Cycles), and dummy cycles (DMY Cycles). The third command packet includes data transfer cycles (DATA Trf Cycles) that initializes the data transfer from the source memory device to the destination memory device. The host device asserts both CE1 and CE2 signals to select the source and destination memory devices during the third command packet and the data transfer.

FIG. 3E illustrates a further example of separated command packets on the shared bus. During sending a first command packet, the host device asserts CE1 signal to select the source memory device and dis-asserts CE2 signal to unselect the destination memory device. The first command packet includes information of command read cycles (CMD RD1 CE1 Cycles) that specifies the source memory device to perform a read operation, and address information of the data to be read (Addr CE1 Cycles). During sending a second command packet, the host device asserts CE2 signal to select the destination memory device and dis-asserts CE1 signal to unselect the source memory device. The second command packet includes information of command write cycles (CMD WR1 CE2 Cycles) that specifies the destination memory device to perform a write operation and address information of data to be written (Addr CE2 Cycles). The third command packet includes data transfer cycles (DATA Trf Cycles) that initializes the data transfer from the source memory device to the destination memory device. The host device asserts both CE1 and CE signals to select the source and destination memory devices during the third command packet and the data transfer.

Figure 4:
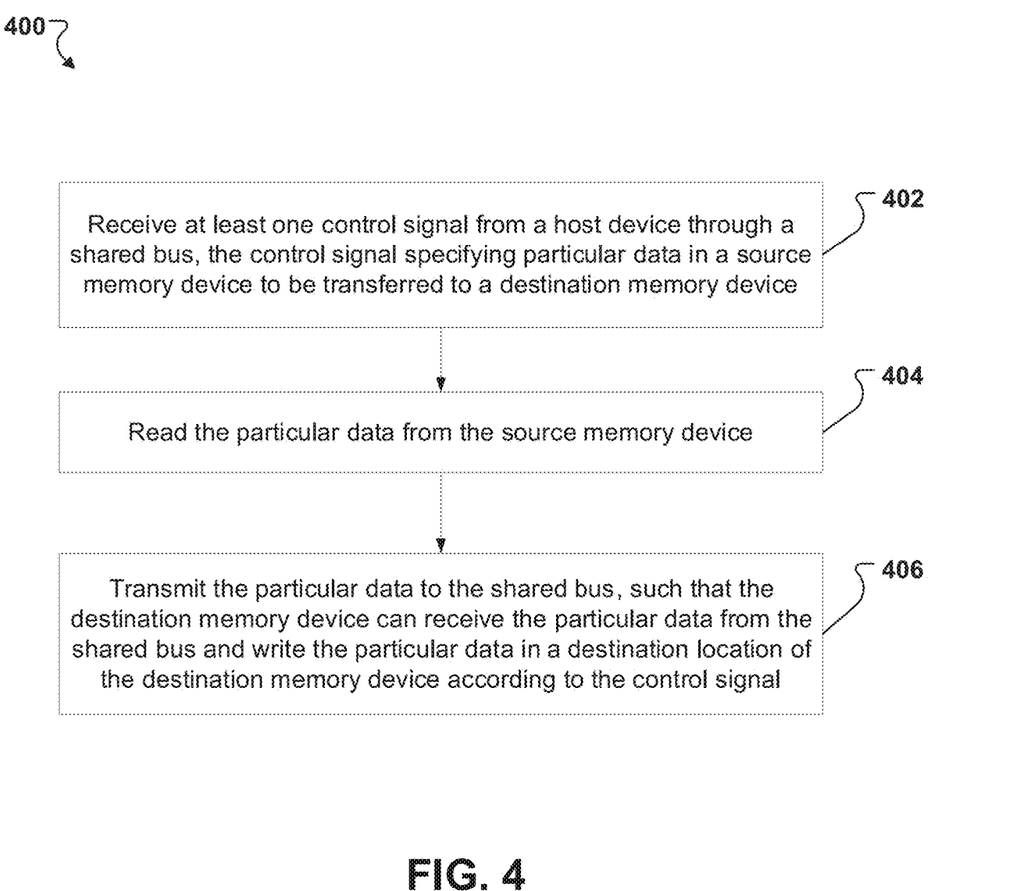
FIG. 4 illustrates a flow chart for an example process of data transfer between memory devices on a shared bus, according to one or more implementations.

FIG. 4 illustrates an example process 400 of data transfer between memory devices on a shared bus, according to one or more implementations. The shared bus can be the shared bus 102 of FIG. 1A or the shared bus 202 of FIGS. 2A-2C. The process 400 can be performed by a source memory device. The source memory device can be the memory device 110a of FIGS. 1A and 1B, or the flash memory device 212 of FIGS. 2A-2C.

In some implementations, the source memory device includes a primary memory (e.g., a flash memory) and a memory controller. The memory controller can include a processor and a secondary memory (e.g., a RAM). The memory controller can perform the process 400. The memory controller receives a control signal from a host device through the shared bus (402). The control signal specifies particular data in the primary memory of the source memory device to be transferred to a destination memory device. The memory controller can be the memory controller 112a of FIG. 1B. The host device can be the host device 120 of FIG. 1A or the host device 220 of FIGS. 2A-2C. The destination memory device can be the memory device 110b of FIGS. 1A and 1C, or the RAM device 214 of FIGS. 2A-2C.

As noted above, the control signal can specify a first memory device to be the source memory device and a second memory device to be the destination memory device. The control signal can also include source address information of the particular data to be read from the primary memory of the source memory device and destination address information of the particular data to be written in the destination memory device.

The host device can send a clock signal to the shared bus, and the source memory device and the destination memory device can receive the clock signal from the shared bus. The clock signal is for synchronization of the source memory device and the destination memory device.

The memory controller reads the particular data specified by the control signal from the primary memory of the source memory device (404). The memory controller then transmits the particular data to the shared bus (406). The destination memory device can receive the particular data from the shared bus directly without through the host device. The destination memory device can then write the particular data in a destination location specified by the control signal. The particular data can be kept transferring until the particular data is completely transferred or the source and destination memory devices are unselected by the host device.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system for data transfer between memory devices, the system comprising:
   a plurality of memory devices including first and second memory devices; and
   a shared bus coupled to the plurality of memory devices, wherein the first memory device is configured to:
      receive at least one control signal on the shared bus from a host device coupled to the shared bus and
      in response to receiving the control signal, transmit data specified by the control signal from the first memory device to the shared bus, and
   wherein the second memory device is configured to:
      receive the control signal on the shared bus from the host device and
      in response to receiving the control signal, receive the data from the first memory device on the shared bus, the control signal specifying transferring the data from the first memory device to the second memory device, and
   wherein one of the first and second memory devices has a slower response time than the other one of the first and second memory devices, and the control signal comprises one or more dummy cycles for the one of the first and second memory devices relative to the other one of the first and second memory devices.

2. The system of claim 1, wherein the first memory device is configured to transmit the data after obtaining a clock signal, and the second memory device is configured to receive the data after obtaining the clock signal, the clock signal being for synchronization between the first memory device and the second memory device.

3. The system of claim 2, wherein one of the first memory device and the second memory device is configured to provide the clock signal to the shared bus.

4. The system of claim 2, wherein the clock signal is provided when the first and second memory devices are powered on.

5. The system of claim 2, wherein the clock signal is provided by the host device to the shared bus, and wherein the host device is coupled to the shared bus and configured to communicate to the plurality of memory devices through the shared bus.

6. The system of claim 1, wherein the host device is configured to select each of the plurality of memory devices by asserting a respective chip enable signal, and
   wherein the host device is configured to simultaneously select the first and second memory devices by asserting one of a common chip enable signal and respective first and second chip enable signals when the data is transferred from the first memory device to the second memory device.

7. The system of claim 1, wherein the control signal comprises information of source and destination memory devices, source address information for the data to be read out, and destination address information for the data to be written in, and
   wherein the information of source and destination memory devices specifies the first memory device to be the source memory device and the second memory device to be the destination memory device.

8. The system of claim 7, wherein the control signal comprises length information of the data to be transferred.

9. The system of claim 1, wherein the host device is configured to send the control signal in a single command packet to the shared bus.

10. The system of claim 9, wherein the host device is configured to send a specific command to the first and second memory devices through the shared bus, the specific command configuring the first and second memory devices to be in a stateless protocol where the first and second memory devices have no information about a previous data stream and start fresh with each data input.

11. The system of claim 1, wherein the host device is configured to send the control signal in a series of separate command packets to the shared bus.

12. The system of claim 11, wherein the series of separate command packets comprise a first command to the first memory device for a read operation and address information of the data to be read.

13. The system of claim 12, wherein the host device is configured to select the first memory device by asserting a first chip enable signal and unselect the second memory device when the first command is sent to the shared bus.

14. The system of claim 11, wherein the series of separate command packets comprise a second command to the second memory device for a write operation and address information of the data to be written.

15. The system of claim 14, wherein the host device is configured to select the second memory device by asserting a second chip enable signal and unselect the first memory device when the second command is sent to the shared bus.

16. The system of claim 11, wherein the series of separate command packets comprise a data transfer command for initializing transferring the data from the first command device to the second command device.

17. The system of claim 11, wherein the host device is configured to send a specific command to the first and second memory devices through the shared bus, the specific command configuring the first and second memory devices to be in a stateful protocol where information about previous data characters or packets is stored in variables and used to affect processing of a current character or packet.

18. The system of claim 11, wherein the host device is configured to:
   dis-assert first and second chip enable signals for unselecting the first and second memory devices to interrupt the data transferring, and
   re-assert the first and second chip enable signals for selecting the first and second memory devices to resume the data transferring.

19. The system of claim 1, wherein the data specified by the control signal is transferred directly from the first memory device to the second memory device through the shared bus without passing through the host device.

20. The system of claim 1, wherein the host device is configured to receive the data from the shared bus when the data is transferred from the first memory device to the second memory device on the shared bus.

21. A memory device comprising:
a memory for storing data;
a memory controller coupled to the memory and configured to:
receive a control signal from a host device through a shared bus, the control signal including information associated with particular data in the memory to be transferred to a second memory device;
read the particular data specified by the control signal from the memory; and
transmit the particular data to the shared bus such that the second memory device is capable of receiving the particular data from the shared bus and writing the particular data in a destination location of the second memory device according to the control signal,
wherein one of the memory devices has a slower response time than the other one of the memory devices, and the control signal comprises one or more dummy cycles for the one of the memory devices relative to the other one of the memory devices.

22. A memory device comprising:
a memory for storing data;
a memory controller coupled to the memory and configured to:
receive a control signal from a host device through a shared bus, the control signal including information associated with particular data to be transferred from a source memory device and to be stored in the memory;
receive the particular data from the source memory device through the shared bus; and
write the particular data in a destination location of the memory according to the control signal,
wherein one of the memory devices has a slower response time than the other one of the memory devices, and the control signal comprises one or more dummy cycles for the one of the memory devices relative to the other one of the memory devices.

23. The system of claim 1, wherein the control signal specifies transferring the data from the first memory device to two or more memory devices including the second memory device.

* * * * *